(12) United States Patent
Kriesel et al.

(10) Patent No.: US 8,836,793 B1
(45) Date of Patent: Sep. 16, 2014

(54) TRUE COLOR NIGHT VISION (TCNV) FUSION

(75) Inventors: Jason Kriesel, Westminster, CA (US); Nahum Gat, Manhattan Beach, CA (US)

(73) Assignee: Opto-Knowledge Systems, Inc., Torrance, CA (US)

( * ) Notice: Subject to any disclaimer, the term of this patent is extended or adjusted under 35 U.S.C. 154(b) by 612 days.

(21) Appl. No.: 13/209,269

(22) Filed: Aug. 12, 2011

Related U.S. Application Data (60) Provisional application No. 61/373,795, filed on Aug. 13, 2010.

(51) Int. Cl.
*H04N 5/33* (2006.01)

(52) U.S. Cl.
USPC .......................................................... 348/164

(58) Field of Classification Search
CPC .... H04N 5/33; H04N 13/025; H04N 13/0271
USPC .......................................................... 386/164
See application file for complete search history.

(56) References Cited

U.S. PATENT DOCUMENTS

| | | | |
|---|---|---|---|
| 24,356 A | 6/1859 | Miller | |
| 582,219 A | 5/1897 | Mosher | |
| 2,149,743 A | 3/1939 | Newick | |
| 2,251,473 A | 8/1941 | Touceda | |
| 3,082,674 A | 3/1963 | Bagby | |
| 3,591,250 A | 7/1971 | Feinstein et al. | |
| 3,596,096 A | 7/1971 | Koehler | |
| 4,011,452 A | 3/1977 | Meyers | |
| 4,034,208 A | 7/1977 | Vaeth et al. | |
| 4,040,807 A | 8/1977 | Midwinter et al. | |
| 4,407,563 A | 10/1983 | Minott | |
| 4,431,917 A | 2/1984 | Gibbons | |
| 4,507,551 A | 3/1985 | Howard et al. | |
| 4,583,814 A | 4/1986 | Koetser | |
| 4,678,332 A | 7/1987 | Rock et al. | |
| 4,725,733 A | 2/1988 | Horman et al. | |

(Continued)

FOREIGN PATENT DOCUMENTS

| | | |
|---|---|---|
| JP | 2187632 A | 7/1990 |
| JP | 2245621 A | 10/1990 |

(Continued)

OTHER PUBLICATIONS

Duncan, W.D., et al. "A millimetre/submillimetre common user photometer for the James Clerk Maxwell Telescope," Royal Stronomical Society, 243:126-132, 1990.

(Continued)

*Primary Examiner* — Huy T Nguyen
(74) *Attorney, Agent, or Firm* — Perkins Coie LLP (57) ABSTRACT

True color images are produced by combining data collected from one or more color cameras with data collected from one or more infrared cameras. The produced images are the result of combining portions of the visible light data with portions of the infrared light data that may have been captured at dark, at daytime or at low light level conditions. These images appear as normal color images, with infrared information highlighted in a non-distracting fashion. The true color images that are produced in this fashion can also facilitate identification and reproduction of various objects that may not be visible or readily identifiable in infrared or false color imagery.

36 Claims, 3 Drawing Sheets

(56) References Cited

U.S. PATENT DOCUMENTS

| | | |
|---|---|---|
| 4,783,593 A | 11/1988 | Noble |
| 4,797,700 A | 1/1989 | Tsuji et al. |
| 4,825,055 A | 4/1989 | Pollock |
| 4,828,376 A | 5/1989 | Padera |
| 4,862,002 A | 8/1989 | Wang et al. |
| 4,904,055 A | 2/1990 | Bridges |
| 5,001,558 A | 3/1991 | Burley et al. |
| 5,021,657 A | 6/1991 | Kettlewell et al. |
| 5,061,035 A | 10/1991 | Rogers, Jr. |
| 5,198,671 A | 3/1993 | Hatch et al. |
| 5,371,369 A | 12/1994 | Kent |
| 5,386,315 A | 1/1995 | Amon et al. |
| 5,424,872 A | 6/1995 | Lecuyer et al. |
| 5,444,236 A | 8/1995 | Ludington et al. |
| 5,489,959 A | 2/1996 | Akada |
| H1599 H | 10/1996 | Task |
| 5,689,746 A | 11/1997 | Akada et al. |
| 5,737,119 A | 4/1998 | Mladjan et al. |
| 5,781,817 A | 7/1998 | Nomura et al. |
| 5,805,325 A | 9/1998 | Clune |
| 5,811,816 A | 9/1998 | Gallagher et al. |
| 5,822,222 A | 10/1998 | Kaplinsky et al. |
| 5,909,308 A | 6/1999 | Ulrich |
| 5,966,945 A | 10/1999 | Mengel et al. |
| 5,994,701 A | 11/1999 | Tsuchimoto et al. |
| 5,997,187 A | 12/1999 | Hamasaki |
| 6,008,492 A | 12/1999 | Slater et al. |
| 6,023,061 A | 2/2000 | Bodkin |
| 6,108,133 A | 8/2000 | Joffre et al. |
| 6,121,616 A | 9/2000 | Trigg |
| 6,122,919 A | 9/2000 | Patel et al. |
| 6,133,569 A | 10/2000 | Shoda et al. |
| 6,144,031 A | 11/2000 | Herring et al. |
| 6,174,061 B1 | 1/2001 | Cooper |
| 6,175,678 B1 | 1/2001 | Sanghera et al. |
| 6,249,374 B1 | 6/2001 | Chipper |
| 6,292,212 B1 | 9/2001 | Zigadlo et al. |
| 6,355,939 B1 | 3/2002 | Dodd |
| 6,357,910 B1 | 3/2002 | Chen et al. |
| 6,370,329 B1 | 4/2002 | Teuchert |
| 6,414,708 B1 | 7/2002 | Carmeli et al. |
| 6,443,637 B1 | 9/2002 | Dowe |
| 6,515,285 B1 | 2/2003 | Marshall et al. |
| 6,529,267 B1 | 3/2003 | Duchon et al. |
| 6,560,029 B1 | 5/2003 | Dobbie et al. |
| 6,661,498 B1 | 12/2003 | Hirukawa |
| 6,678,395 B2 | 1/2004 | Yonover et al. |
| 6,707,044 B2 | 3/2004 | Lannestedt et al. |
| 6,758,595 B2 | 7/2004 | Seitz |
| 6,762,884 B2 | 7/2004 | Beystrum et al. |
| 6,798,578 B1 | 9/2004 | Beystrum et al. |
| 6,806,471 B2 | 10/2004 | Matsukuma et al. |
| 6,826,358 B2 | 11/2004 | Partynski et al. |
| 6,853,452 B1 | 2/2005 | Laufer |
| 7,002,154 B2 | 2/2006 | Wellman et al. |
| 7,157,706 B2 | 1/2007 | Gat et al. |
| 7,282,715 B2 | 10/2007 | Barron |
| 7,286,163 B2 | 10/2007 | Hara et al. |
| 7,307,793 B2 | 12/2007 | Ottney et al. |
| 7,358,496 B2 | 4/2008 | Fleury et al. |
| 7,427,758 B2 | 9/2008 | Garman et al. |
| 7,466,343 B2 | 12/2008 | Gat |
| 7,544,944 B2 | 6/2009 | Strandemar et al. |
| 7,613,360 B2 | 11/2009 | Ma et al. |
| 7,620,265 B1 | 11/2009 | Wolff et al. |
| 7,646,884 B2 | 1/2010 | Remillard et al. |
| 7,655,895 B2 | 2/2010 | Breed |
| 7,655,909 B2 | 2/2010 | Schimert et al. |
| 7,676,062 B2 | 3/2010 | Breed et al. |
| 7,705,855 B2 | 4/2010 | Brown Elliott |
| 7,720,257 B2 | 5/2010 | Morellas et al. |
| 7,724,412 B2 | 5/2010 | Powell et al. |
| 7,816,650 B2 | 10/2010 | Garman et al. |
| 8,071,947 B2 | 12/2011 | Garman et al. |
| 8,164,813 B1 | 4/2012 | Gat et al. |
| 8,462,418 B1 | 6/2013 | Gat et al. |
| 8,466,964 B2 | 6/2013 | Gat et al. |
| 8,497,479 B1 | 7/2013 | Garman et al. |
| 2002/0030163 A1 | 3/2002 | Zhang |
| 2002/0175268 A1 | 11/2002 | Smith |
| 2003/0043352 A1 | 3/2003 | Sudoh et al. |
| 2003/0086164 A1 | 5/2003 | Abe |
| 2003/0161049 A1 | 8/2003 | Okada et al. |
| 2003/0213897 A1 | 11/2003 | Pieri et al. |
| 2004/0129881 A1 | 7/2004 | Hamrelius et al. |
| 2004/0223069 A1 | 11/2004 | Schoonmaker et al. |
| 2004/0238741 A1 | 12/2004 | Gat et al. |
| 2005/0270784 A1 | 12/2005 | Hahn et al. |
| 2006/0017816 A1 | 1/2006 | Gat |
| 2006/0072014 A1 | 4/2006 | Geng et al. |
| 2006/0091310 A1 | 5/2006 | Furry |
| 2006/0119803 A1 | 6/2006 | Abe et al. |
| 2006/0221180 A1 | 10/2006 | Ostromek et al. |
| 2006/0255275 A1 | 11/2006 | Garman et al. |
| 2007/0120058 A1 | 5/2007 | Blackwell et al. |
| 2007/0176104 A1 | 8/2007 | Geneczko et al. |
| 2007/0221849 A1 | 9/2007 | Tabirian et al. |
| 2009/0084956 A1 | 4/2009 | Gat |
| 2009/0169102 A1 | 7/2009 | Zhang et al. |
| 2010/0309315 A1* | 12/2010 | Hogasten et al. ............ 348/164 |
| 2011/0169962 A1 | 7/2011 | Gat et al. |
| 2011/0174979 A1 | 7/2011 | Garman et al. |

FOREIGN PATENT DOCUMENTS

| | | |
|---|---|---|
| JP | 3041328 A | 2/1991 |
| JP | 05172635 A | 7/1993 |
| JP | 5343710 A | 12/1993 |

OTHER PUBLICATIONS

Gom, B.G., et al., "A cryogenic detector for submillimeter astronomy," Master of Science Thesis, University of Lethbridge, Alberta, Canada, 3:25-46, Mar. 1999.

Toet, L. "Towards Full Color Night Vision," TNO Defence, Security and Safety, Mar. 2008 (126 pages).

* cited by examiner

TRUE COLOR NIGHT VISION (TCNV) FUSION

RELATED APPLICATIONS

This application claims priority from U.S. provisional application No. 61/373,795 filed on Aug. 13, 2010, which is incorporated herein by reference in its entirety for all purposes.

FEDERALLY SPONSORED RESEARCH OR DEVELOPMENT

This invention was made with government support under grant W911NF-08-C-0127 awarded by the U.S. Army. The government has certain rights in the invention.

FIELD OF INVENTION

The present application relates generally to the field of image fusion systems, methods, and algorithms, and specifically to night vision systems with color information.

BACKGROUND

This section is intended to provide a background or context to the disclosed embodiments that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Color Night Vision systems relate to image methodologies and hardware, tailored specifically to provide color-enhanced night vision. Traditional night vision systems typically display scene information in monochrome (traditionally green, although red or other colors are possible, as well) images that represent information found in the infrared, which humans cannot see directly. Some color night vision systems attempt to improve upon traditional night vision systems by adding visible light information to the typical infrared (usually Thermal Infrared (TIR)) information, in order to create a more realistic image, to which the user can better relate. These systems rarely retain realistic color information and often require very expensive and complex components that limit their use in practical applications. Moreover, because such conventional color night vision systems do not accurately produce visible colors associated with objects in a scene, they are often referred to as synthetic color or otherwise not true color night vision systems.

SUMMARY

This section is intended to provide a summary of certain exemplary embodiments and is not intended to limit the scope of the embodiments that are disclosed in this application.

The disclosed embodiments relate to devices, methods, systems, and computer program products that provide true color night vision images by fusing visible color information from an imaging sensor that is sensitive to at least part of the visible spectrum, and infrared information obtained from an imagine sensor that is sensitive to at least part of the infrared spectrum (e.g., thermal, as well as other infrared spectra). The true color night vision images that are produced in accordance with the disclosed embodiments provide accurate color representations of a scene even at low light levels, at a reasonable cost and at reasonable levels of complexity.

One aspect of the disclosed embodiments relates to a method of producing an image that comprises obtaining a first image data from a color imaging device, obtaining a second image data from an infrared imaging device, separating chroma data and luma data associated with the first image data, and processing luma data associated with the second image data to produce edge data. The method additionally includes combining the luma data associated with the first image data, the luma data associated with the second image and the edge data to produce a combined luma data, and fusing the combined luma data with the chroma data to obtain a true color image.

In one exemplary embodiment, the edge data is produced by processing luma data associated with both the first and the second image data. In another embodiment, the combined luma data comprises a weighted combination of each of the luma data associated with the first image data, the edge data, and the luma data associated with the second image data. In one variation, proportions of each of the luma data associated with the first image data, the edge data and the luma data associated with the second image data are user adjustable.

According to one exemplary embodiment, the above noted method of producing an image further comprises spatially and/or temporally smoothing the chroma data prior to the fusing. In another exemplary embodiment, the above noted method also includes adjusting a composition of the chroma data in accordance with a white balancing technique. In still another embodiment, Near Infrared (NIR) information is excluded from the first image data by placing an NIR blocking filter between incoming radiation from a scene and input aperture of the color imaging device. In this embodiment, the Near Infrared (NIR) blocking filter can be removed when intensity level of the incoming radiation drops below a particular level. The Near Infrared (NIR) blocking filter may be removed either automatically or manually by a user, and possibly in variable quantities.

In another exemplary embodiment, the first image data comprises Visible to Near Infrared (VNIR) data. In one variation, the Visible to Near Infrared (VNIR) data comprises data associated with a narrow portion of the Near Infrared (NIR) spectrum. For example, the narrow portion of the Near Infrared (NIR) spectrum can correspond to a range of wavelengths used by an infrared laser-pointing device. In this example, the laser-pointing device creates an invisible target that human eyes cannot see, so in this exemplary embodiment, the laser dot on the target is included in the true color image.

In one embodiment, the above noted method of producing an image further includes obtaining one or more additional image data from one or more additional imaging devices. In this embodiment, the combined luma data is obtained by combining the luma data associated with the one or more additional image data with the luma data associated with the first image data, the luma data associated the second image data and the edge data. In some examples, the one or more additional imaging devices can be any one of a Short Wave Infrared (SWIR) imaging device, a Mid Wave Infrared (MWIR) imaging device, a Long Wave Infrared (LWIR) device, and a radar imaging device.

According to another embodiment, the above noted method of producing an image also includes filtering the luma data associated with the second image data to obtain information associated with a narrow portion of the infrared spectrum, and assessing the presence or absence of a particular substance within scenery associated with the second image data in accordance with the obtained information. For example, such an assessment can facilitate a determination of mineral content, water content, and/or presence of explosives.

Another aspect of the disclosed embodiments relates to a system for producing images. The system includes a color imaging device that is configured to produce a first image data, and an infrared imaging device that is configured to produce a second image data. The above noted system further includes a processor that is configured to separate chroma data and luma data associated with the first image data and process luma data associated with the second image data to produce edge data. The processor is further configured to combine the luma data associated the first image data, the luma data associated with the second image data and the edge data to produce a combined luma data, and also to fuse the combined luma data with the chroma data to produce a true color image.

In one example embodiment, the first imaging device and the second imaging device are configured to share an aperture for capturing incoming radiation from a scene. In another example embodiment, the first imaging device and the second imaging device are positioned in a side-by-side configuration to separately capture incoming radiation from a scene. In one exemplary embodiment, the first imaging device, the second imaging device, and the processor are part of a binocular viewing apparatus. In still another embodiment, the above noted system also includes a Near Infrared (NIR) blocking filter that is positioned between incoming radiation from a scene and input aperture of the color imaging device. In one variation, the processor is configured to detect an intensity level of the incoming radiation and provide an indication to trigger the removal of the Near Infrared (NIR) blocking filter when the intensity level drops below a particular level. In one example, the Near Infrared (NIR) blocking filter is user removable. In yet another embodiment, the above noted system further includes a Near Infrared (NIR) notch filter positioned between incoming radiation from a scene and input aperture of the color imaging device, where the Near Infrared (NIR) notch filter is configured to allow transmission of only a narrow portion of the Near Infrared (NIR) spectrum.

According to still another embodiment, the above noted system further includes one or more additional imaging devices. In such embodiments, the processor is configured to obtain one or more additional image data from the one or more additional imaging devices, and produce the combined luma data by combining the luma data associated with the one or more additional image data with the luma data associated with the first image data, the luma data associated the second image data and the edge data. In some example embodiments, the one or more additional imaging devices can be any one of a Short Wave Infrared (SWIR) imaging device, a Mid Wave Infrared (MWIR) imaging device, a Long Wave Infrared (LWIR), and a radar imaging device.

Another aspect of the disclosed embodiments relates to a computer program product that is embodied on a non-transitory computer readable medium. The computer program product includes program code for obtaining a first image data from a color imaging device, program code for obtaining a second image data from an infrared imaging device and program code for separating chroma data and luma data associated with the first image data. The computer program product further includes program code for processing luma data associated with the second image data to produce edge data, program code for combining the luma data associated with the first image data, the luma data associated with the second image data and the edge data to produce a combined luma data. The computer program product also includes program code for fusing the combined luma data with the chroma data to obtain a true color image.

DETAILED DESCRIPTION OF CERTAIN EMBODIMENTS

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Humans react to the natural world intuitively, and the human brain is accustomed to seeing color imagery. Humans extract significant information from colors in the visible spectrum of light. Therefore, creating color images in low light or dark situations can be beneficial for enhancing a user's ability to extract useful information from captured imagery. Existing night vision systems create only monochrome images (typically green). Some thermal imaging systems create a false color thermal scale—from blue-cold to red or white-hot. These systems provide some basis for human vision interpretation, but do not provide real full color information, which the human brain prefers. Although no existing night vision system yet incorporates the full color spectrum, some existing systems combine color and infrared. However, such systems require sufficient light available for the color camera. Therefore, such systems produce true colors only during the day time, and cannot maintain true color in the dark. Moreover, such systems fail to provide additional benefits and enhancements that are described in the sections that follow in connection with the disclosed embodiments.

Other systems rely on multiple high-cost and hard-to-obtain intensifiers to create a Red-Green-Blue (RGB) color space (i.e., one intensifier-equipped camera with a red filter, one with a green filter, and one with a blue filter, which, when all three cameras are used together, provide RGB color). Such systems may be able to operate in low light conditions, but they do not utilize infrared radiation and simply operate as a color imager at low light levels. As a result, such systems are not capable of highlighting Thermal Infrared (TIR) features, which are useful for night vision object identification (such as finding warm engines, people, etc.). Another drawback of such systems is that they contain very expensive and very complex components that make them economically infeasible for use in many practical applications. In addition, in order to enable proper operation of such systems in bright environments (e.g., to prevent image saturation and to avoid damaging the intensifiers), the image intensifiers must be gated, which reduces the quality of the produced imagery. In the absence of the gating mechanisms, the images produced by such systems may be of little use when, for example, a bright flashlight is turned on in a dark room, or when a window is suddenly opened in a dark building.

The disclosed embodiments provide several advantages to users, including true color during daytime, at night, in the dark, or any other low light situation, while enhancing that true color image with infrared or other information that is otherwise invisible to humans. The disclosed embodiments further enable accurate reproduction of a scene in color that includes highlighted infrared variations, such as thermal variations due to animals, recently used vehicle engines, etc. Furthermore, the disclosed embodiments can also highlight features through edge detection, providing a halo effect showing objects of interest. The disclosed embodiments are not confined to applications that relate to 'night vision' systems but are rather applicable to a broader range of imaging systems and methods. For example, certain exemplary embodiments can further identify and reproduce composition variations in a scene, which may be due to, for example, mineral or water content of the objects, presence of explosives within a captured scene and the like, without distorting the natural colors of the scene. These and other features of the disclosed embodiments are realized at a reasonable cost and at a reasonable level of complexity.

The images that are produced in accordance with certain embodiments are the result of combining portions of the visible light spectrum with portions of the infrared light spectrum to incorporate infrared features in a manner that appears natural to human vision. Therefore, these images can appear as normal color images, with infrared information highlighted in a non-distracting fashion. For example, in a low light situation where human eyes cannot distinguish objects of interest, an aspect of the disclosed embodiments allows the user not only to see that there is a warm body (e.g., a person) in the dark, but also to distinguish whether that person is wearing a green shirt or a red shirt.

In one exemplary embodiment, a true color night vision (TCNV) system creates the fused imagery. The disclosed TCNV system includes at least one processor for fusing imagery and at least two cameras including a Low Light Level (LLL) color camera.

Figure 1:
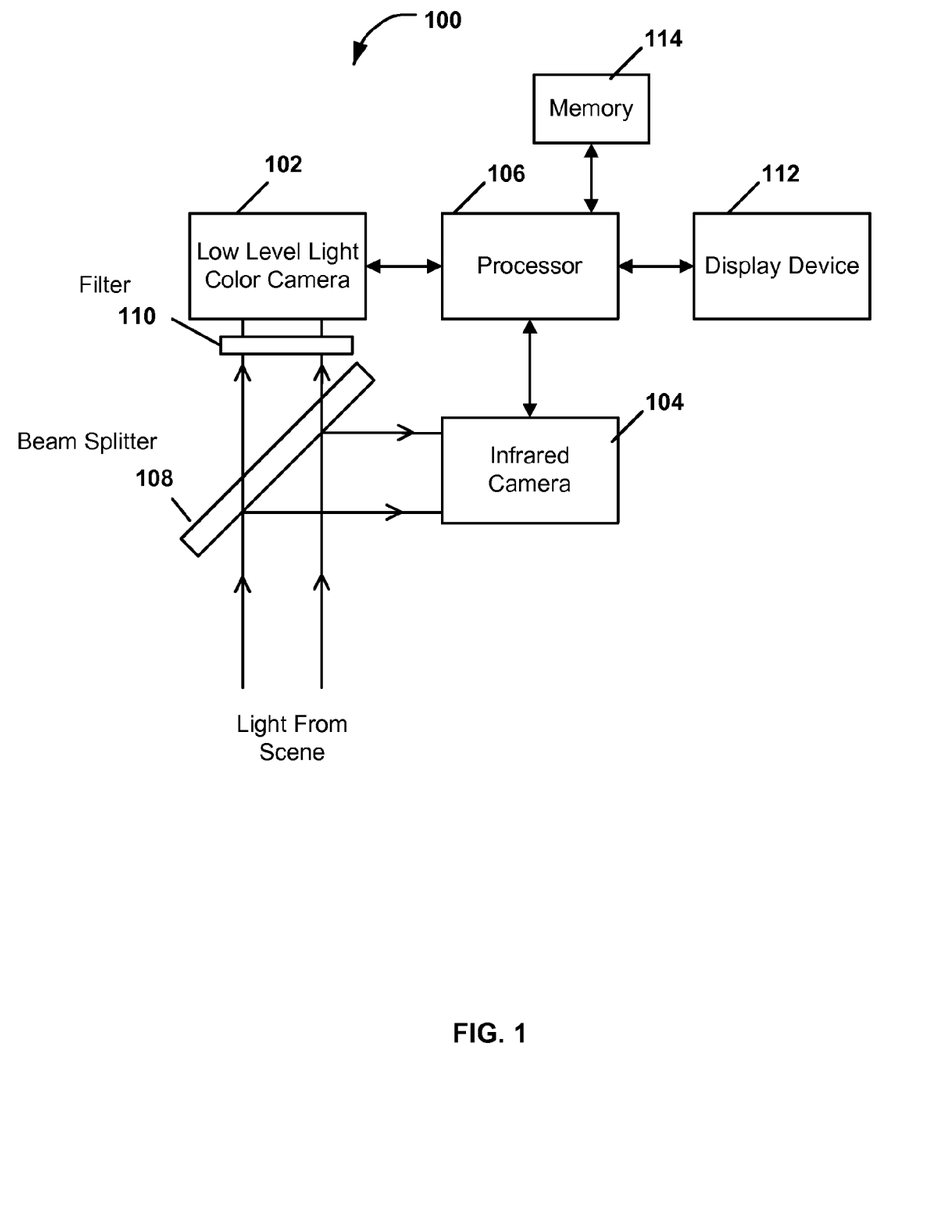
FIG. 1 is a block diagram of a true color night vision color fusion system in accordance with an exemplary embodiment.

FIG. 1 illustrates a TCNV system 100 in accordance with an exemplary embodiment. The TCNV system 100 includes at least one Low Light Level (LLL) color camera 102 (e.g., a color EMCCD, CMOS, or CCD-based camera) that utilizes reflected scene or object light to form images. The TCNV system 100 further includes at least one Thermal Infrared (TIR) camera 104 (e.g., a microbolometer camera) utilizing thermal emitted radiation from the scene or objects to form imagery. The TCNV system 100 of the disclosed embodiments can be adapted to produce one or both of still images and videos. The Processor 106 (e.g., an FPGA, DSP, GPU, or embedded processor) processes image information from one or more sensors 102, 104, and can enable the display of the fused images on a display device 112. A portion of the screen of the display device 112 may further enable a user to provide input (e.g., adjustable parameters in the form of data values entered via a keyboard and/or a mouse on graphical user interface) to the processor 106. Such parameters, as will be discussed in the sections that follow, can provide adjustments to the color and brightness of the displayed images, thereby providing an optimized display of the true color images. The processor 106 may also be in communication with (or comprise as part of the processor) a memory 114. The memory 114 may store program code, data, and other information that is accessible to the processor 106. Moreover, the memory 114 may be used, at least in part, to store the data obtained from the Low Light Level (LLL) color camera 102 and/or the Thermal Infrared (TIR) camera 104. The memory 114 may also be used, at least in part, to store the final fused image data, as well as intermediate data values that may be produced during the processing of the various image data.

The exemplary diagram in FIG. 1 also depicts a beam splitter 108 and (optionally) one or more filter(s) 110 that may be used to selectively transmit and/or reflect portions of the incoming light (e.g., certain wavelengths of incident light) to the Low Light Level (LLL) color camera 102 and the infrared camera 104. The beam splitter 108 and the one or more filter(s) 110 can also be used to further improve the quality of the fused images. In one example, the beam splitter 108 is a dichroic beam splitter. It should be noted that the TCNV system 100 may also utilize other components, such as gratings, lenses, and the like, to direct, focus and otherwise facilitate the propagation of the light into and within the TCNV system 100.

The Low Light Level (LLL) color camera 102 and Thermal Infrared (TIR) camera 104 each produce a separate image of the night scene that includes various objects, such as people, cars, lighted signs (e.g., traffic lights or lighted exit signs) and their surroundings. In some embodiments, the Low Light Level (LLL) color camera 102 produces chroma information and luma information in the Visible to Near Infrared (VNIR) range of spectrum. It should be noted that chroma and luma information associated with the captured images can be presented and manipulated in a variety of formats. For example, luma and chroma information may be in Y'CbCr, YCbCr, YUV, or other color spaces that are known in the art. In some embodiments, the Low Light Level (LLL) color camera 102 uses a Bayer-like color mosaic pattern with RGB, CMY, CMYG, sparse, or any other color mosaic pattern. In some implementations, the Low Light Level (LLL) color camera 102 may use a color pattern on the pixels that are red-green-blue, or alternatively the complementary colors such as cyan-yellow-magenta, or cyan-yellow-magenta-green. In some embodiments, the Low Light Level (LLL) color camera 102 uses color filters to create the color imagery. Those color filters, for example, can be mechanically switched or electronically tuned to provide selective transmission or capture of the proper spectral contents of the incoming light. The color dyes used to generate the filters may also transmit Near Infrared (NIR) radiation. The Low Light Level (LLL) color camera 102 may utilize various well-known methods to process (e.g., de-mosaic) image information to produce color information that can be further processed to extract chroma information. At least some of the color processing operations may be carried out using the processor 106 that is depicted in FIG. 1.

The TCNV system 100 extracts color information obtained from the Low Light Level (LLL) color camera 102 and processes the chroma data independently from the luma data. In this way, the TCNV system 100 can run various color processing and enhancement algorithms on the chroma data, without affecting the luma information. In one exemplary embodiment, the TCNV system 100 is configured to apply a smoothing algorithm to the chroma data. For example, a filter with a Gaussian Kernel can be used to carry out the smoothing operations. The smoothing algorithm facilitates the removal of spatial and temporal noise from the images. When chroma data is processed using the above noted smoothing techniques, the resolution may be reduced. However, such a reduction in resolution is not likely to significantly impact the perceptual quality of the images since human vision perception does not require (or utilize) fine chroma resolution.

In some embodiments, the TCNV system 100 utilizes a filter, such as filter 110 depicted in FIG. 1, to block the Near Infrared (NIR) radiation from reaching the Low Light Level (LLL) color camera 102. Since Low Light Level (LLL) color cameras are often sensitive to Near Infrared (NIR) radiation, blocking the Near Infrared (NIR) radiation can preserve the fidelity of the color data. Therefore, in scenarios where there is adequate light (e.g., above quarter moon or above starlight conditions), the use of Low Light Level (LLL) color camera 102 with a Near Infrared (NIR) blocking filter improves true color composition of the captured imagery. In some embodiments, however, when the light received from the reflected scene and/or object illumination falls below a predetermined threshold, the Near Infrared (NIR) blocking filter may be removed to allow additional light to reach the Low Light Level (LLL) color camera 102, thereby increasing the sensitivity of the camera. The removal (and/or the placement) of the Near Infrared (NIR) blocking filter may be carried out manually by a user, or may be done automatically. For example, the processor 106 can detect that the incoming illumination has fallen below a certain threshold and create an indication (e.g., a signal) that triggers the removal of the Near Infrared (NIR) blocking filter. In some embodiments, the Near Infrared (NIR) blocking filter is an adjustable filter that allows the transmission of variable quantities of the Near Infrared (NIR) radiation.

In some embodiments, the TCNV system 100 may include several different Near Infrared (NIR) blocking filters. In one example, the plurality of Near Infrared (NIR) blocking filters may be utilized and designed to improve color composition (as described above). In another example, the Near Infrared (NIR) blocking filters may be further designed to allow visualization of certain Near Infrared (NIR) lasers, which are used for pointing and aiming (e.g., by hunters or military personnel). In the latter example, the Near Infrared (NIR) blocking filter operates as a notch filter that blocks all but a portion of the Near Infrared (NIR) spectrum, corresponding to a range of wavelengths used by, for example, a laser-pointing/aiming device that is invisible to human eyes. As a result, a user is able to see such pointers or target-markers in the true color image that is produced by the TCNV system.

By separating the chroma and luma, the TCNV fusion system 100 advantageously enables automatic or manual adjustment of one or more of the chroma components to effectuate color balancing operations (e.g., "white balance" processing), and to produce a more true representation of the scene.

The Thermal Infrared (TIR) camera 104 provides luma (brightness) and thermal edge information. The TCNV system 100 extracts chroma using the Low Light Level (LLL) color camera data, and as described above, can manipulate that data independently from luma data. In some embodiments, the TCNV system 100 extracts image luma from several possible sources that include one or more of: the Low Light Level (LLL) color camera 102, the Thermal Infrared (TIR) camera 104, and additional cameras, such as a Short Wave Infrared (SWIR) camera, that may be configured to operate with the TCNV system 100. In one example, the TCNV system 100 extracts luma data from the Low Light Level (LLL) color camera 102, as well as from the Thermal Infrared (TIR) camera 104. All image data outside of the visible wavelength range (e.g., infrared) can constitute luma information and may be used collectively, or individually, to enhance the appearance of the fused image. Chroma data, on the other hand, is limited to data corresponding to the approximate wavelength range 400-700 nm, which represents a range of visible "color" information to which the human eye is sensitive, and is collected only by the Low Light Level (LLL) color camera.

Traditional night vision systems that are comprised of shorter (ultraviolet) or longer (infrared) wavelength sensors can create "false color" images. For instance, collected infrared data presented in "false color" images may represent the scene in a green color (with intensity of the infrared data being shown using green color with varying brightness), or some other false color representation. For instance, when describing the thermal, Long Wave Infrared (LWIR) images, a false color of "more red" can correspond to a hotter object, whereas a false color of "more blue" can correspond to a colder object. Another example is systems that employ algorithms to identify objects in an image and attempt to provide them with appropriate colors, such as detecting "grass" and coloring that green. This generic colorizing does not reflect the true colors of the scene, but rather, a set of false colors. In contrast to the conventional systems, the disclosed embodiments enable the production of images that represent "true" color utilizing visible color information in the scene.

In further contrast to the traditional night vision systems, the TCNV system 100, in accordance with the disclosed embodiments, combines luma data from various sources to create total scene brightness data. In one embodiment, the luma data is collected from at least two sensors, using one or several exemplary methods, including, but not limited to, adding the data points (i.e., at each location in the scene, adding the luma values collected by each of the observing sensors), averaging the data points, creating weighted averages, and the like.

The TCNV system 100, in accordance with the disclosed embodiments, fuses imagery from Thermal Infrared (TIR) camera 104, which is sensitive to emitted radiation (i.e., heat), with imagery from the Low Light Level (LLL) color camera 102, which is sensitive to reflected light. Unlike some conventional systems, the fused imagery that is produced by the TCNV system of the present application does not contain 'washed out' color information. This is accomplished, at least in part, by separating the chroma information from the Low Light Level (LLL) color camera and, therefore, preserving the complimentary information of the different sources (including color) in both daytime and nighttime conditions. As such, the information contained in the scene imagery in any one of the at least two image sensors is maintained, and is not lost through the fusion algorithm.

An aspect of the disclosed embodiments relates to maintaining accurate color information (which may be collected as chroma data from the Low Light Level (LLL) color camera 102), and then supplementing the color information with brightness (luma) information that may be obtained from a plurality of sources (e.g., from the Low Light Level (LLL) color camera 102, the Thermal Infrared (TIR) camera 104, etc.). The brightness data, which may be obtained from a plurality of sources, may undergo several operations, such as averaging, edge detection, simple addition, and the like, before being fused with the chroma data. These features of the disclosed embodiments allow an accurate color rendition of the scene, whether during day or at night, when compared to broadband systems, where infrared radiation ruins accurate color representation.

One of the advantages of separating chroma from luma is that the TCNV system of the present application can carry out further data processing operations separately on each of the luma and chroma data. In one embodiment, the luma data collected from the Thermal Infrared (TIR) camera 104 is subjected to edge detection algorithms that provide clear edge information in luma space. The produced edge information can be integrated into luma/chroma data to produce very clear thermal highlighting in the fused color image. In particular, an object in a scene that emits more or less warmth than its surroundings, or otherwise exhibits a high level of contrast to its surroundings for a given camera system (such as living material when seen against rock/minerals in the Mid Wave Infrared (MWIR) or Long Wave Infrared (LWIR) ranges), creates distinguishable edges as compared to its surroundings. Where a scene on all sides of a particular object may be at a noticeably different temperature than the object, a strong contrast is created. In accordance with the disclosed embodiments, the TCNV system can create an edge dataset of high contrast objects, which can be used in a variety of fashions for creating optimized fused imagery. In one example embodiment, the addition of edge detection information provides a nice, subtle way of highlighting "warm" objects in a scene or amongst scenery (e.g., an outline of a human body in a dark room).

In some embodiments, the information obtained from the color camera (e.g., the Low Light Level (LLL) color camera 102 of FIG. 1) is used as the base or primary information. In these embodiments, the luma data collected by other sources (e.g., the Thermal Infrared (TIR) camera 104 of FIG. 1, and/or other non-color imaging devices within the TCNV system), as well as the edge data produced from one or more of the aforementioned capturing devices, are used to supplement the luma data that is collected by the color camera. In one example, the final luma channel contains all of the information obtained from the color camera, while comprising some or all of the luma information obtained from other non-color imaging devices. This way, the final image is enhanced by including at least the following information: (1) true color information associated with the scene, (2) luma information obtained from the color camera, (3) appropriately scaled luma information obtained from the non-color imaging device (e.g., corresponding to areas of high temperature contrast, sources of thermal radiation, etc.), and (4) highlighted, or otherwise emphasized, edge information. The images that are produced in this way do not contain washed out or saturated sections, and, therefore, greatly improve one's ability to view and analyze the objects within a captured scene.

Figure 2:
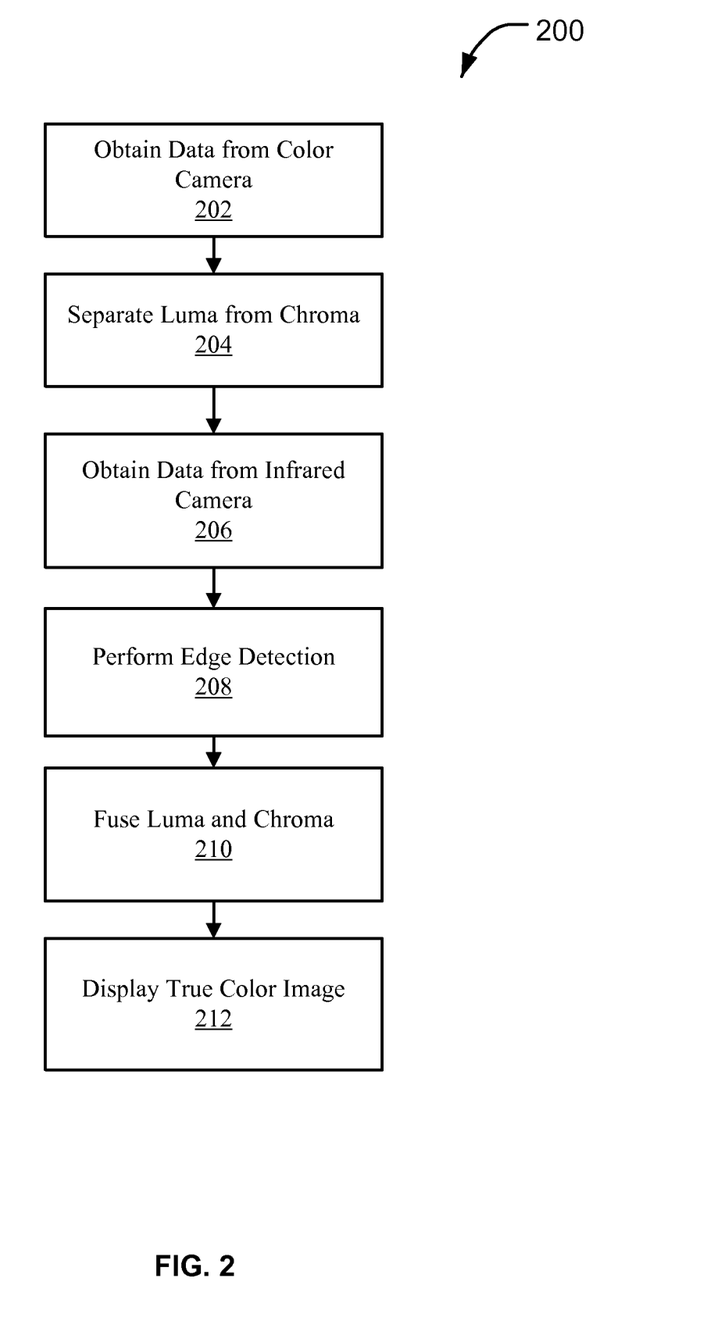
FIG. 2 is a set of operations for obtaining a true color vision image in accordance with an exemplary embodiment.

FIG. 2 illustrates a set of operations 200 that can be carried out to produce true color fused images in accordance with an exemplary embodiment. At 202, data from one or more color cameras is obtained. For example, a Low Light Level (LLL) color camera 102 that is depicted in FIG. 1 can be used to obtain color imagery of a scene under almost any light conditions. In some embodiments, the data that is collected from the color camera includes Visible to Near Infrared (VNIR) data. In some embodiments, the data collected by the color camera excludes the Near Infrared (NIR) portion of the spectrum. For example, with reference to FIG. 1, a filter 110 may be placed in front of the Low Light Level (LLL) color camera 102 that blocks Near Infrared (NIR) light. In some embodiments, the data that is collected at 202 includes visible data and only a portion of the Near Infrared (NIR) spectrum that, for example, corresponds to a narrow range of wavelengths used for laser pointing devices.

At 204, the data obtained from the color camera is processed to separate the chroma from luma. In some embodiments, the separation of the chroma and luma data may be carried out by one or more components within the color camera. At 206, data from one or more infrared cameras is obtained. For example, a Long Wave Infrared (LWIR) camera may be used to obtain thermal radiation data from the scene.

At 208, edge detection operations are performed on the luma data. In some embodiments, edge detection is carried out by utilizing the luma data obtained from the infrared camera. Alternatively, or additionally, edge detection operations can be carried out using luma data obtained from the color camera. In one example, the luma obtained from the color camera is combined with the luma data obtained from the infrared camera, and then edge detection is performed on the combined luma data.

Referring back to FIG. 2, at 210, the luma data, augmented with edge detection data, is fused with chroma data to produce the true color night vision imagery. In some embodiments, the true color images are produced by combining the luma data from two or more sources (e.g., luma from color camera data and infrared camera data) with the edge detection data, and then fusing the chroma data with the combined luma data. Combining the luma data can include simple addition, averaging, weighted averaging, and similar operations. In some exemplary embodiments, only luma data from the infrared source is fused with the chroma data. In some embodiments, multiple color and/or infrared cameras may be used to collect chroma/luma information from a scene.

Finally, at 212, the true color image is displayed. The image (e.g., still image or video) that is displayed at 212 accurately represents the colors of a scene, and/or objects therein, obtained during day time, night time and/or at low light conditions. In displaying the true color image, the TCNV system may convert the fused image data into a common color video signal, such as those used in television or computer systems (e.g., YUV, YCbCr, RGB, etc.). In one example, a viewer or user of the TCNV system observes, in the final output, true color information, with objects that emit relatively greater infrared information being brighter than the surrounding background. Because of the TCNV fusion processing, a person hiding in the background (shadows) can appear brightly, and in his/her original clothing color. Such information can be used to preserve physical characteristics of the scene for identification purposes.

In accordance with the disclosed embodiments, by bringing in additional information, such as edge detection data, the TCNV system can form edge lines around objects of high thermal contrast, such that the detected thermal objects are not only displayed at higher brightness levels but can be further highlighted by incorporating an edge or halo around that object.

Figure 3:
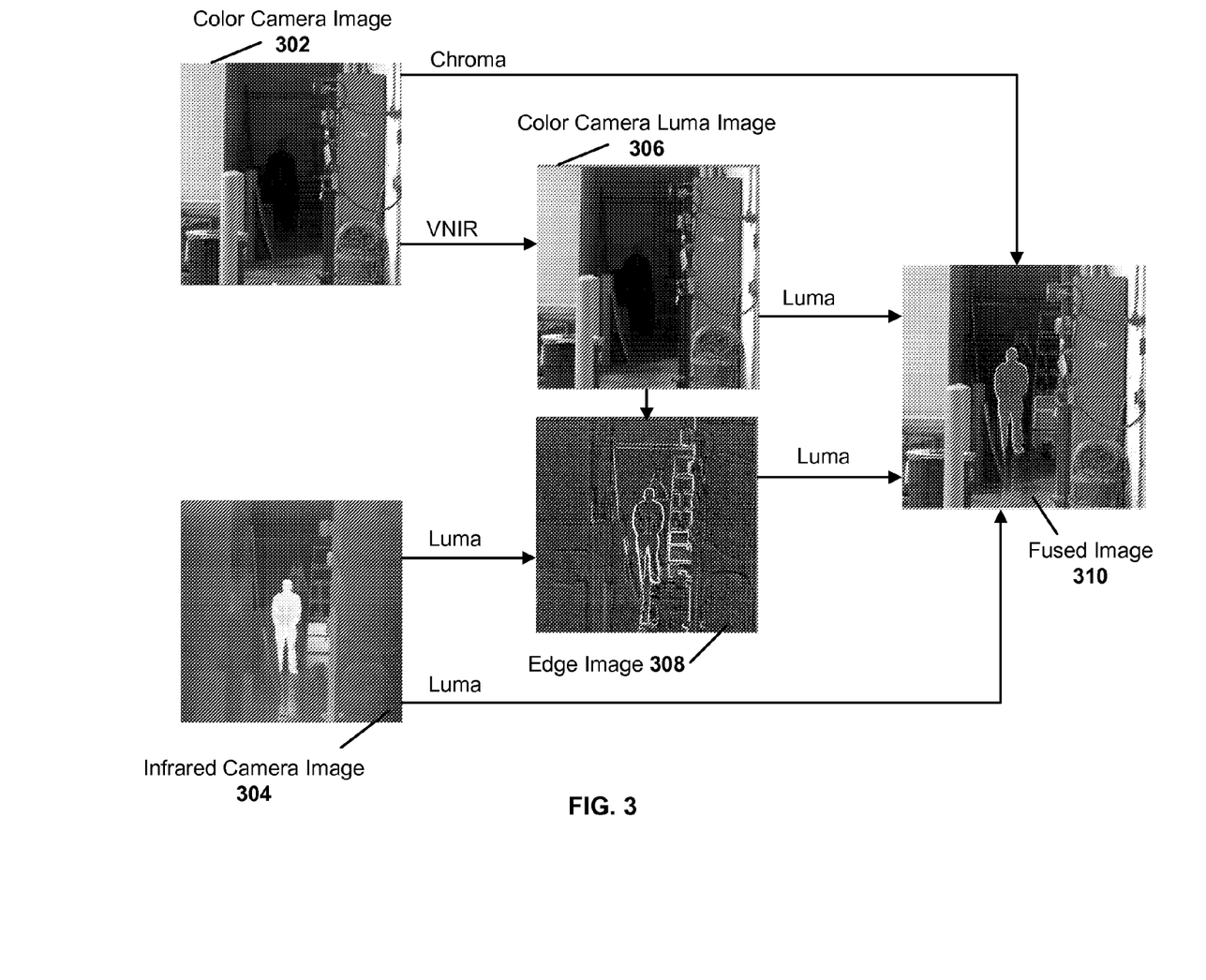
FIG. 3 is diagram for combining data obtained from a color camera and an infrared camera in accordance with an exemplary embodiment.

FIG. 3 illustrates a set of exemplary images that facilitate understanding of the operations that can be carried out by the TCNV system of the present application. The color camera image 302 contains both luma and chroma data. FIG. 3 also illustrates color camera luma image 306 that may be generated using the color camera image 302 data. FIG. 3 further depicts an infrared camera image 304 that comprises only luma data and may be used to derive the edge image 308. The fused image 310 may be generated using chroma data obtained from the color camera, the luma data obtained by the infrared camera, and the edge data. In some embodiments, an edge image 308 can be obtained from color camera luma image 306.

The TCNV system of the present application may utilize one or more processors (such as the processor 106 depicted in FIG. 1) to fuse two images and/or video streams without the need to synthetically colorize the night scene images. As such, the TCNV system of the present application can output a user-viewable direct image stream (e.g., analog or digital video), store fused images on internal or external video or image capture devices, and/or provide additional processing of the video streams onboard. The disclosed TCNV system further provides for both automatic and manual selection of optimal parameters for viewing preferences. These parameters can, for example, adjust for lighting conditions selected from incandescent, fluorescent, mercury, sodium, moon, star, daylight, and other common light sources. These parameters can further provide for a weighted combination of each of the luma data associated with the color image data, the infrared image data, and the edge data. In one example, the proportions of each of the chroma data, color image luma data, infrared luma data, and the edge data are each independently user adjustable.

The TCNV fusion system of the present application can be implemented using several hardware configurations. As described in connection with FIG. 1, the TCNV system may include one or more processors 106 or processing hardware, that can be implemented as an FPGA, a DSP, a GPU, etc. In one example embodiment, the processor 106 is implemented as part of an FPGA and provides real-time video processing capabilities with minimal delay between an incoming stream of multiple camera inputs and an output stream of fused imagery. Having a system that is operational at low latencies (i.e., minimal delay between data capture and output display) is important to avoid motion sickness in driving applications.

The processor 106 that is depicted in FIG. 1 may be in communication with a memory 114 through an interface. The processor 106 may also be connected to at least one communication unit (not shown) that enables the exchange of data and information, directly or indirectly, through a communication link with other entities, devices, databases, networks and the like. Such a communication link may provide wired and/or wireless communication capabilities in accordance with one or more communication protocols, and therefore, it may comprise the proper transmitter/receiver antennas, circuitry, and ports, as well as the encoding/decoding capabilities that are necessary for proper transmission and/or reception of data and other information.

As depicted in the exemplary diagram of FIG. 1, the TCNV system of the present application can be configured to capture the light from the scene using the Low Light Level (LLL) color camera 102 and the infrared camera 104 such that the two cameras 102, 104 "see" the same scene (i.e., they share the same aperture). To this end, in one embodiment, the beam splitter 108 is a dichroic beam splitter that reflects the Thermal Infrared (TIR) radiation into the infrared camera 104, while allowing visible light radiation to pass through the beam splitter 108 to the Low Light Level (LLL) color camera 102. As such, this embodiment advantageously provides co-aligned optical axes for the cameras, thereby greatly reducing or eliminating any parallax issues. For proper image registration purposes, the beam splitter reflection requires "flipping" one of the images (i.e., the mirror image), which can be performed by signal processing algorithms executed by the processor 106.

In another embodiment, the components of the TCNV system 100 may be re-arranged and selected in such a way to allow the Low Light Level (LLL) color camera 102 to receive the incoming light in a reflective path, while the infrared camera 104 receives the IR radiation in a transmissive path. In yet another embodiment, the two cameras 102, 104 are placed side by side, which allows each of the cameras 102, 104 to directly view the scene. In this embodiment, rectification of the images does not require flipping one image. However, there is some level of parallax viewing. For long distance viewing, this is not important, as the parallax is typically confined to sub-pixel levels.

An example embodiment of such a side by side arrangement is a true color night vision set of binoculars, similar in outward appearance to the current helmet-mounted night vision systems (e.g., stand-alone binoculars, helmet mounted goggles, and the like, generally referred to as a "binocular viewing apparatus"). In such an example embodiment, the color camera, the infrared camera, the processing components (e.g., processor, state machine, etc.,) and the associated storage media may be fully or partially incorporated into the binocular viewing device. The images/videos that are captured by the two or more cameras may be processed by the electronic circuitry to produce a final true color image. In one example, the final image appears (e.g., is projected) on the binocular viewing device in such a way that it can be readily viewed by a person that is holding the binoculars or wearing the goggles. In other examples, one or more of the display device, the processing components and the storage media is located at a physically separate location than the binoculars. For instance, in such example embodiments, various components of the true color vision system may communicate with each other using one or more wireless protocols or techniques. In other examples, the communication between various components may be additionally, or alternatively, carried out using a wired communication link.

In any of the above noted configurations of the TCNV system, conventional image registration techniques (e.g., shift, rotation, and stretch) can be used to align each of the images for cameras.

The TCNV system of the present application can be configured to provide various options for conducting the fusion process. The TCNV fusion system of the present application further allows a user and/or viewer to adjust various fusion options. In one embodiment, a user can select to view one of many extracted image channels, e.g., a user may select to view an image produced by the Low Light Level (LLL) color camera, the infrared camera, a luma-only image, a luma image that is enhanced with edge detection data, an edge image only image, and any combinations thereof. Further, the user may select to combine different proportions of each of the luma, chroma, and edge data associated with any of the above noted sources in order to view an optimized image.

As noted earlier, the TCNV system of the present application may also be configured to combine additional information from other cameras or imaging devices that can capture scene information in other ranges of electromagnetic radiation, such as Short Wave Infrared (SWIR), Mid Wave Infrared (MWIR), radar (e.g., synthetic aperture radar (SAR)), etc., into the luma channel. The collected brightness information can be further processed (e.g., to produce edge data, to provide a weighted average, to provide a cumulative brightness channel, etc.) and fused with the chroma data that is obtained from a color camera (e.g., a Low Light Level (LLL) color camera).

Using a Low Light Level (LLL) color camera enables the TCNV system of the present application to maintain true color in low light-level conditions. In one embodiment, a color EMCCD camera may be utilized, but the system could use other similarly functioning camera options including sparse color array cameras, high sensitivity CCD or CMOS cameras, tunable filters-based cameras, color image intensified type cameras, and the like. Furthermore, the TCNV system of the present application provides true-color fused images and provides functionality in nighttime and other low-light-level conditions. However, the disclosed TCNV system is not strictly limited to low light levels and can also function well during the day without the need for an additional daytime camera.

For improved scene understanding, such as in intelligence, reconnaissance, surveillance, and performing other tasks such as driving or walking in the woods, fusion of thermal (i.e., emitted) and Visible to Near Infrared (VNIR) (i.e., reflected) imagery provides certain advantages, including, but not limited to, providing complimentary information from two separate sources into a single composite image. The disclosed TCNV system provides the general ability to include color information in the fused video imagery, which enables better object detection and scene segmentation through the additional contrast that a color display affords. The disclosed TCNV fusion system provides specific capability of true-color, as opposed to false-color or pseudo color. There is an important distinction here, since true-color sensitivity enables the additional information inherent in the color of clothing, automobiles, road signs, warning lights, markers, flags, insignias, etc., to be utilized by a human or computer algorithm, whereas false-color and pseudo-color systems cannot provide such capabilities. Numerous studies have shown the benefits of true-color systems for human visual tasks, such as improved reaction times, scene understanding, and object identification. In a sense, the human brain is wired for comprehending images (the world around us) in true-color. For Thermal Infrared (TIR) example, a human or a computer program can identify the red color associated with a warning sign, even at night, thereby allowing instant and easy identification of such an important object.

The TCNV system of the present application may be used in numerous applications, including but not limited to, perimeter monitoring, surveillance viewing, security monitoring, enhanced viewing while hunting animals in the woods, weapon sighting, and car/truck driver vision enhancement. In some applications, the Thermal Infrared (TIR)/Long Wave Infrared (LWIR) camera may be replaced or augmented with a Short Wave Infrared (SWIR) or a Mid Wave Infrared (MWIR) camera in order to highlight other spectral features that are not associated with temperature, such as mineral content, water content, plant stress and the like. These functionalities or applications can include systems for staring at open terrain and highlighting areas of increased concentrations of certain minerals, or viewing vast fields of crops and highlighting stressed plants, etc. The addition of color information to the infrared imagery can allow quick identification of objects, such as blue versus green veins of copper minerals (hydrated copper carbonate is blue).

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), Hard Disc Drives (HDD), Solid State Drives (SSD), Compact Discs (CD), Digital Versatile Discs (DVD), Blu-ray Discs (BD), etc. Therefore, the computer-readable media described in the present application comprise non-transitory storage media. Generally, program modules may include routines, programs, objects, components, data structures, etc., that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

It is understood that the various embodiments of the present invention may be implemented individually, or collectively, in devices comprised of various hardware and/or software modules and components. In describing the disclosed embodiments, sometimes separate components have been illustrated as being configured to carry out one or more operations. It is understood, however, that two or more of such components can be combined together and/or each component may comprise sub-components that are not depicted.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method of producing an image, comprising:
   obtaining a first image data from a color imaging device;
   obtaining a second image data from an infrared imaging device;
   separating chroma data and luma data associated with the first image data;
   processing luma data associated with the second image data to produce edge data;
   combining the luma data associated with the first image data, the luma data associated with the second image and the edge data to produce a combined luma data; and
   fusing the combined luma data with the chroma data to obtain a true color image.

2. The method of claim 1, wherein the edge data is produced by processing luma data associated with both the first and second image data.

3. The method of claim 1, wherein the combined luma data comprises a weighted combination of each of the luma data associated with the first image data, the luma data associated with the second image data, and the edge data.

4. The method of claim 3, wherein proportions of each of the luma data associated with the first image data, the luma data associated with the second image data and the edge data are user adjustable.

5. The method of claim 1, further comprising spatially and/or temporally smoothing the chroma data prior to the fusing.

6. The method of claim 1, further comprising adjusting a composition of the chroma data in accordance with a white balancing technique.

7. The method of claim 1, wherein Near Infrared (NIR) information is excluded from the first image data by placing a Near Infrared (NIR) blocking filter between incoming radiation from a scene and input aperture of the color imaging device.

8. The method of claim 7, wherein the Near Infrared (NIR) blocking filter is removed when intensity level of the incoming radiation drops below a particular level.

9. The method of claim 1, wherein the first image data comprises Visible to Near Infrared (VNIR) data.

10. The method of claim 9, wherein the Visible to Near Infrared (VNIR) data comprises data associated with a narrow portion of the Near Infrared (NIR) spectrum.

11. The method of claim 10, wherein the narrow portion of the Near Infrared (NIR) spectrum corresponds to a range of wavelengths used by a laser-pointing device.

12. The method of claim 1, wherein the fusing is carried out in accordance with real-time fusion parameters that can be adjusted by a user to optimize viewing quality of the true color image.

13. The method of claim 1, further comprising:
obtaining one or more additional image data from one or more additional imaging devices, wherein the combined luma data is obtained by combining the luma data associated with the one or more additional image data with the luma data associated with the first image data, the luma data associated the second image data and the edge data.

14. The method of claim 13, wherein the second imaging device and the one or more additional imaging devices can be any one of a Short Wave Infrared (SWIR) imaging device, a Mid Wave Infrared (MWIR) imaging device, a Long Wave Infrared (LWIR) device, and a radar imaging device.

15. The method of claim 1, further comprising
filtering the luma data associated with the second image data to obtain information associated with a narrow portion of the infrared spectrum, and
assessing the presence or absence of a particular substance within scenery associated with the second image data in accordance with the obtained information.

16. The method of claim 15, wherein the assessing facilitates a determination of mineral content, water content, and/or presence of explosives.

17. A system, comprising:
a color imaging device configured to produce a first image data;
an infrared imaging device configured to produce a second image data; and
a processor configured to
separate chroma data and luma data associated with the first image data,
process luma data associated with the second image data to produce edge data,
combine the luma data associated the first image data, the luma data associated with the second image data, and the edge data to produce a combined luma data, and
fuse the combined luma data with the chroma data to produce a true color image.

18. The system of claim 17, wherein the first imaging device and the second imaging device are configured to share an aperture for capturing incoming radiation from a scene.

19. The system of claim 17, wherein the first imaging device and the second imaging device are positioned in a side-by-side configuration to separately capture incoming radiation from a scene.

20. The system of claim 19, wherein the first imaging device, the second imaging device, and the processor are part of a binocular viewing apparatus.

21. The system of claim 17, wherein processor is configured to produce the edge data by processing luma data associated with both the first and the second image data.

22. The system of claim 17, wherein processor is configured to produce the combined luma data by combining a weighted combination of each of the luma data associated with the first image data, the luma data associated with the second image data, and the edge data.

23. The system of claim 22, wherein proportions of each of the luma data associated with the first image data, the luma data associated with the second image data, and edge data are user adjustable.

24. The system of claim 17, wherein the processor is further configured to spatially and/or temporally smooth the chroma data.

25. The system of claim 17, wherein the processor is configured to adjust a composition of the chroma data in accordance with a white balancing technique.

26. The system of claim 17, further comprising a Near Infrared (NIR) blocking filter positioned between incoming radiation from a scene and input aperture of the color imaging device.

27. The system of claim 26, wherein the processor is configured to detect an intensity level of the incoming radiation and provide an indication to trigger removal of the Near Infrared (NIR) blocking filter when the intensity level drops below a particular level.

28. The method of claim 26, wherein the Near Infrared (NIR) blocking filter is user removable.

29. The system of claim 17, wherein the first image data comprises Visible to Near Infrared (VNIR) data.

30. The system of claim 29, further comprising a Near Infrared (NIR) notch filter positioned between incoming radiation from a scene and input aperture of the color imaging device, wherein the Near Infrared (NIR) notch filter is configured to allow transmission of only a narrow portion of the Near Infrared (NIR) spectrum.

31. The system of claim 29, wherein the processor is configured to fuse the combined luma data with the chroma data in accordance with real-time fusion parameters that can be adjusted by a user to optimize viewing quality of the true color image.

32. The system of claim 17, further comprising:
one or more additional imaging devices, wherein the processor is configured to:
obtain one or more additional image data from the one or more additional imaging devices, and
produce the combined luma data by combining the luma data associated with the one or more additional image data with the luma data associated with the first image data, the luma data associated the second image data and the edge data.

33. The system of claim 17, wherein the second imaging device and the one or more additional imaging devices can be any one of a Short Wave Infrared (SWIR) imaging device, a Mid Wave Infrared (MWIR) imaging device, a Long Wave Infrared (LWIR) device and a radar imaging device.

34. The system of claim 17, wherein the processor is further configured to:
filter the luma data associated with the second image data to obtain information associated with a narrow portion of the infrared spectrum, and
assess the presence or absence of a particular substance within scenery associated with the second image data in accordance with the obtained information.

35. The system of claim 34, wherein processor is configured to facilitate a determination of mineral content, water content, and/or presence of explosives.

36. A computer program product, embodied on a non-transitory computer readable medium, comprising:
program code for obtaining a first image data from a color imaging device;
program code for obtaining a second image data from an infrared imaging device;

program code for separating chroma data and luma data associated with the first image data;
program code for processing luma data associated with the second image data to produce edge data;
program code for combining the luma data associated with the first image data, the luma data associated with the second image data, and edge data to produce a combined luma data; and
program code for fusing the combined luma data with the chroma data to obtain a true color image.

* * * * *

UNITED STATES PATENT AND TRADEMARK OFFICE
CERTIFICATE OF CORRECTION

PATENT NO. : 8,836,793 B1
APPLICATION NO. : 13/209269
DATED : September 16, 2014
INVENTOR(S) : Jason Kriesel et al.

It is certified that error appears in the above-identified patent and that said Letters Patent is hereby corrected as shown below:

On the Title Page, in Item (56), under "OTHER PUBLICATIONS", in Column 2, Line 2, please delete "Stronomical" and insert -- Astronomical --, therefor.

In The Specification

In Column 2, Line 55, please delete "associated the" and insert -- associated with the --, therefor.

In Column 4, Line 11, please delete "is diagram" and insert -- is a diagram --, therefor.

In The Claims

In Column 15, Line 24, in Claim 15, please delete "comprising" and insert -- comprising: --, therefor.

In Column 15, Line 39, in Claim 17, please delete "to" and insert -- to: --, therefor.

Column 16, Line 21, in Claim 28, please delete "method" and insert -- system --, therefor.

Signed and Sealed this
Twenty-sixth Day of May, 2015

Michelle K. Lee
*Director of the United States Patent and Trademark Office*